June 30, 1964  S. LANGNER  3,138,823
MEAT TENDERIZER DEVICE
Filed Aug. 30, 1962  2 Sheets-Sheet 1
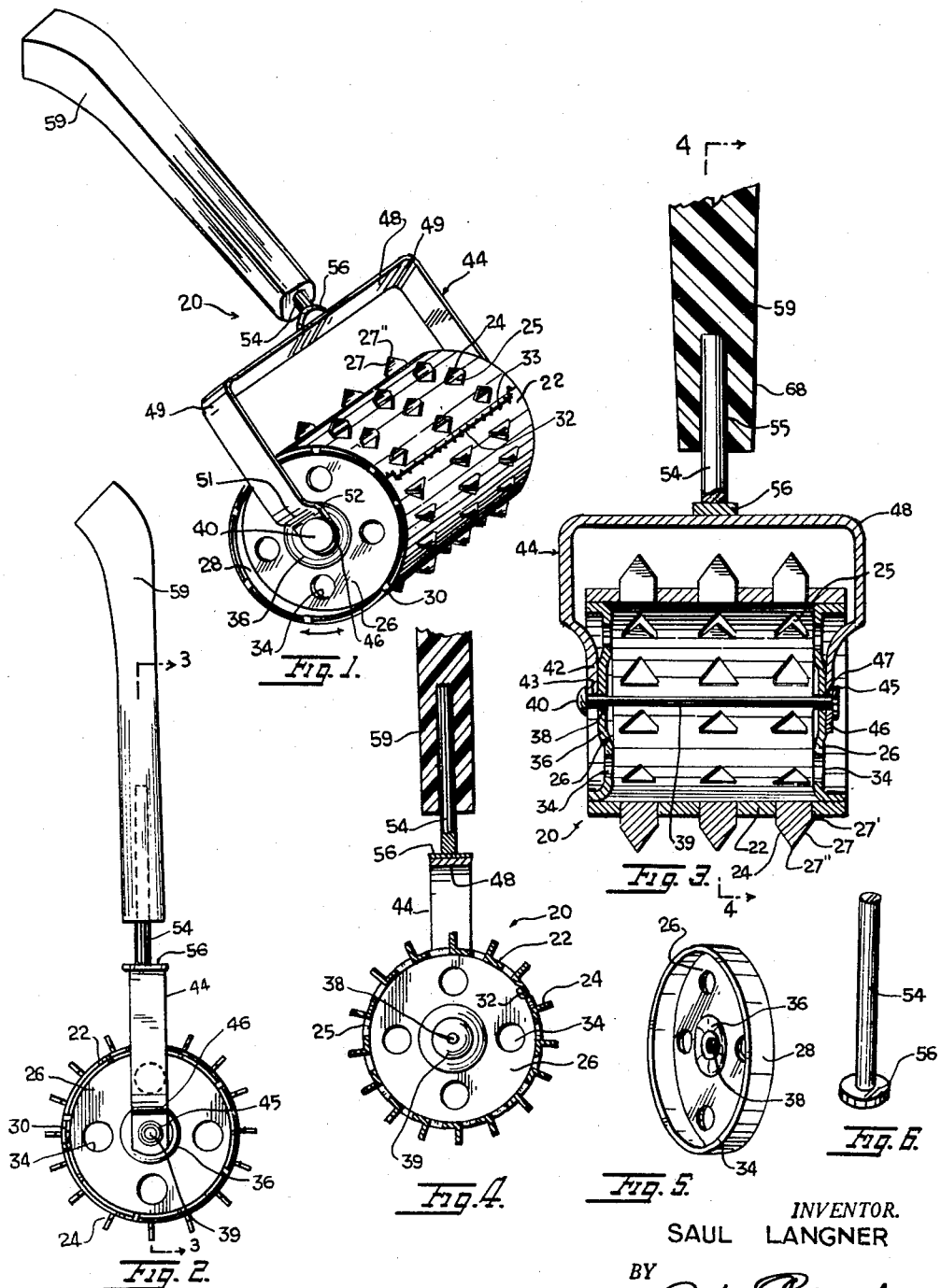
INVENTOR.
SAUL LANGNER
BY
ATTORNEY June 30, 1964 S. LANGNER 3,138,823
MEAT TENDERIZER DEVICE
Filed Aug. 30, 1962 2 Sheets-Sheet 2
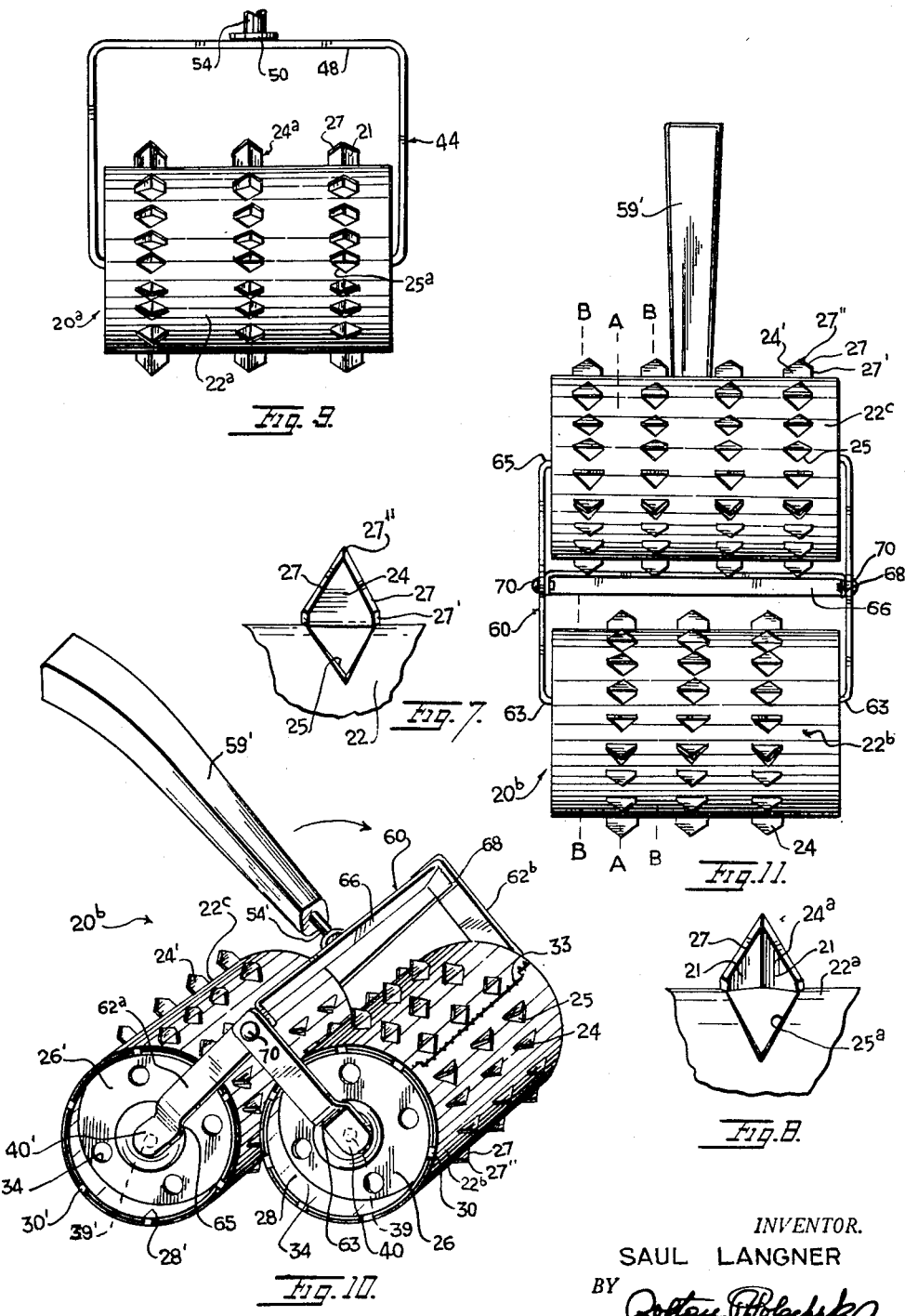
INVENTOR.
SAUL LANGNER
ATTORNEY

United States Patent Office 3,138,823
Patented June 30, 1964

3,138,823
MEAT TENDERIZER DEVICE
Saul Langner, New York, N.Y.
(34—35 76th St., Jackson Heights 72, N.Y.)
Filed Aug. 30, 1962, Ser. No. 224,589
1 Claim. (Cl. 17—29)

This invention relates to devices for tenderizing meat.

According to the invention there is provided a roller device made of sheet metal and having struck out prongs with sharp edges for cutting fibers of meat to tenderize the same.

It has been known heretofore to provide a roller type of meat tenderizer in which the roller was a metal casting having blunt teeth extending radially therefrom. Such a roller type of device crushed the meat without cutting across the fibers so that sufficient tenderizing was not effected.

It is a principal object of the present invention to provide a meat tenderizer employing a cylinder roller made of sheet metal having struck out prongs with sharp edges.

A further object is to provide a meat tenderizer as described with welded parts including cup-shaped cylinder end plates carrying a pivotable handle.

Another object is to provide a meat tenderizer employing a pair of cylinder rollers, each roller being made of sheet metal and having struck out radial prongs, with the prongs in one roller out of alignment with the prongs in the other roller so that tenderizing of the meat is effected more quickly and thoroughly.

Another object is to provide a meat tenderizer which can be more economically manufactured than prior tenderizers; which uses less material in fabrication; which is lighter in weight and easier to handle; which tenderizes meat more effectively; which employs welded joints for greater strength; and which employs stamped and punched parts for lightness and economy.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of a tenderizing device embodying the invention.

FIG. 2 is a side view of the device.

FIG. 3 is an enlarged vertical sectional view on an enlarged scale taken on line 3—3 of FIG. 2.

FIG. 4 is a reduced vertical sectional view taken on line 4—4 of FIG. 3.

FIG. 5 is a perspective view of a cylinder end plate.

FIG. 6 is a perspective view of the frame handle rod.

FIG. 7 is a perspective view of a struck-out prong shown with part of the cylinder.

FIG. 8 is a perspective view of another form of struck-out prong shown with part of the cylinder.

FIG. 9 is a fragmentary front view of another tenderizer device.

FIG. 10 is a perspective view of still another meat tenderizer employing two cylinder rollers.

FIG. 11 is a bottom plan view of the meat tenderizer of FIG. 10.

Referring to FIGS. 1–4, there is shown the meat tenderizing device 20 including a cylinder 22 formed of sheet metal. The cylinder has flat generally triangular prongs 24 struck out of the metal leaving generally triangular openings 25. The prongs are aligned in three circumferential rows with the prongs in each row aligned with other prongs in the other rows longitudinally of the cylinder. The prongs have sharp edges 27 and sharp points 27″ formed when the prongs are struck out of the metal. When the cylinder is rolled over a slab of meat, fish, poultry or other foodstuff, the prongs pierce and cut tendons, fibers, cellular structure and the like to predetermined depth, to tenderize the same for quicker cooking and easier chewing.

Two circular plates 26 having cylindrical peripheral flanges 28 are secured to opposite ends of the cylinder by spot welds 30. Opposite ends of the sheet forming the cylinder are overlapped at 32 and secured by welding 33. The plates 26 have equally spaced holes 34; see FIGS. 1–5. Cleansing of the cylinder is facilitated by the holes 25 in the cylinder and holes 34 in the plates since the cylinder can be readily flushed with water.

Each of the plates 26 has a central convex projection 36 provided with a central hole 38. A rod or shaft 39 passes through aligned holes 38 in the two plates. The rod has a head 40 abutting end 42 of a generally U-shaped handle frame 44. The end 42 of the frame has a hole 43 through which the rod passes. The other end of the rod is flattened and spun to form a bead 45 which abuts end 46 of the frame. The rod passes through hole 47 in frame end 46. The frame is rotatably mounted on rod 39 and the rod is rotatably disposed in holes 38 of plates 26. The bight 48 of the frame is flat, parallel to the axis of cylinder 22 and spaced from the cylinder. The frame has a spring bias at bends 49 at opposite ends of bight 48 so that the arms 50 of the frame tend to spread outwardly to clear the ends of the cylinder as the cylinder rotates. Ends 42 and 46 of the frame are doubly bent at 51, 52 so that the ends of the frame lie within planes of flanges 28 in slidable abutment with projections 36.

A handle rod 54 is provided with an end flange 56; see FIG. 6. Flange 56 is welded to the outer side of bight 48 on the frame. Rod 54 extends into and is secured in a bore 55 in an elongated plastic handle 59.

FIG. 7 shows on an enlarged scale the substantially triangular shape of a flat prong 24 extending radially outwardly of cylinder 22 at one end of hole 25. The prong has two short sharp lateral edges 27′ continuous with sharp edges 27 which meet at the sharp point 27″ of the prong. All these sharp edges cooperate in piercing and cutting the meat or other foodstuff tenderized by the device. The short edges 27′ have lengths equal to the thickness of the metal from which the prong 24 is struck. If desired, these straight parallel edges can be made longer by suitably shaping the dies employed in punching or striking out of the prongs. FIGS. 2, 3 and 4 clearly show the flat prongs 24 extending radially outward of cylinder 22.

FIG. 8 shows a prong 24ª of modified form in which the prong has angularly disposed triangular sides 21. The prong is V-shaped in cross section in all planes extending therethrough concentric to the axis of the cylinder 22ª as well as triangular in radial extension from the cylinder. The prong when struck leaves hole 25ª.

FIG. 9 shows cylinder 22ª provided with three circumferential rows of prongs 24ª. Other parts of cylinder 22ª corresponding to those of cylinder 22 are identically numbered. The device 20ª of FIG. 9 provides more effective piercing and cutting effects on tough meats due to the V-shaped cross sections of the prongs 24ª.

FIGS. 10 and 11 show another tenderizer device 20ᵇ in which parts corresponding to those of device 20 are identically numbered. Cylindrical roller 22ᵇ is similar to roller 22 with three circumferential rows of flat prongs 24. Another roller 22ᶜ is provided having four circumferential rows of flat prongs 24′. The planes of the circumferential rows in roller 22ᵇ are located between the planes of the circumferential rows in roller 22ᶜ as indicated by lines A—A and B—B in FIG. 11.

Frame 60 which supports the rollers 22ᵇ, 22ᶜ includes two flat V-shaped members 62ª, 62ᵇ. Each of the members has a doubly bent end 63 engaged respectively at opposite ends of rod or shaft 39 and secured by shaft heads 40 and beaded ends in the same way as the shaft is formed in the device 20. Each of the members has another doubly bent end 65 engaged at opposite ends of another rod or shaft 39' secured by shaft head 40' and a beaded opposite end. The frame members are joined by a flat strip 66 having turned down end lugs 68 rotatably secured by rivets or eyelets 70 to the apices of the frame members. Handle rod 54' is secured to strip 66 and handle 59' is secured to the rod 54'.

Both rollers 22ᵇ and 22ᶜ are formed from sheet metal bent to cylindrical form and secured at overlapped edges by welding 33. In addition welds 30 and 30' secure the ends of the cylindrical rollers to the cylindrical flanges 28, 28' of end plates 26, 26'.

The rollers of all the tenderizer devices along with the supporting frames or frame members can be attractively plated with bright plating such as chrome, nickel and the like. The devices are easy to handle since they are light in weight and work fast. They are very durable in construction and can easily be cleaned for repeated use.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A meat tenderizer device comprising a hollow cylindrical roller formed from pliable sheet metal, said roller having a plurality of axially spaced circumferential rows of generally triangular outstruck meat penetrating and cutting prongs having a triangular opening at the base of each prong in the roller, permitting entry of severed bits of meat into the hollow interior thereof, the edges of each of said prongs being sharpened and intersecting to form a sharp meat penetrating point, a pair of circular plates having circumferential peripheral flanges in opposite ends of the roller for retaining any severed bits of meat in the hollow interior of the roller, and providing internal annular reinforcement to the roller, said roller having welded overlapped portions and spaced spot welds securing said plates to the roller, and handle means pivotally secured to said plates for manually rolling the roller over meat to be tenderized, each of said plates having spaced circular holes thereover whereby the roller may be cleaned by flushing water through the openings and the circular holes to remove any severed bits of meat, each of said prongs having a V-shaped cross section in all planes extending therethrough concentric to the axis of the roller for piercing and cutting the meat being tenderized more effectively.

References Cited in the file of this patent

UNITED STATES PATENTS

| | | |
|---|---|---|
| 1,411,634 | Lambdin | Apr. 4, 1922 |
| 2,092,654 | Nigh | Sept. 7, 1937 |

FOREIGN PATENTS

| | | |
|---|---|---|
| 446,284 | Italy | Mar. 14, 1949 |